(12) United States Patent
Hunt et al.

(10) Patent No.: US 11,009,930 B2
(45) Date of Patent: May 18, 2021

(54) AUTOMATIC USB HOST DETECTION AND PORT CONFIGURATION

(71) Applicant: Microchip Technology Incorporated, Chandler, AZ (US)

(72) Inventors: Jeffrey Hunt, Glendale, AZ (US); Andrew Rogers, Tempe, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 208 days.

(21) Appl. No.: 16/033,061

(22) Filed: Jul. 11, 2018

(65) Prior Publication Data

US 2019/0332152 A1    Oct. 31, 2019

Related U.S. Application Data

(60) Provisional application No. 62/662,902, filed on Apr. 26, 2018.

(51) Int. Cl.
*G06F 1/26* (2006.01)
*G06F 13/42* (2006.01)

(52) U.S. Cl.
CPC .......... *G06F 1/266* (2013.01); *G06F 13/4282* (2013.01); *G06F 2213/0042* (2013.01)

(58) Field of Classification Search
None
See application file for complete search history.

(56) References Cited

U.S. PATENT DOCUMENTS 7,480,753 B2    1/2009  Bohm et al. .................. 710/104
9,852,097 B2 *  12/2017 Steele ................. G06F 11/3051
2002/0169915 A1  11/2002 Wu ............................... 710/305
2008/0215765 A1  9/2008  Butler et al. .................... 710/15
2010/0064153 A1*  3/2010 Gk .......................... G06F 1/266
                                                       713/310
2010/0070659 A1*  3/2010  Ma ......................... H02J 7/0078
                                                       710/14
2011/0279095 A1*  11/2011 Hong ........................ H02J 7/00
                                                       320/164
2012/0166173 A1*  6/2012  Fischbach ............... G06F 1/266
                                                       703/28
2013/0031398 A1*  1/2013  Srivastava ............. H02H 9/046
                                                       713/340
2013/0054983 A1*  2/2013  Zhou ...................... G06F 1/266
                                                       713/300

(Continued)

OTHER PUBLICATIONS

International Search Report and Written Opinion, Application No. PCT/US2019/029170, 11 pages, dated Jul. 25, 2019.

*Primary Examiner* — Jaweed A Abbaszadeh
*Assistant Examiner* — Cheri L Harrington
(74) *Attorney, Agent, or Firm* — Slayden Grubert Beard PLLC

(57) ABSTRACT

A universal serial bus (USB) hub includes detection circuits for a D− and a D+ connection of a USB port and a control circuit. The control circuit is configured to disable, detection circuits, respective impedances. After disabling the respective impedances, the USB hub is further configured to detect, at the detection circuits, respective values from the D+ connection and the D− connection. The USB hub is further configured to, based upon the respective values, switch the USB port between a device port configuration and a host port configuration.

18 Claims, 12 Drawing Sheets

(56) References Cited

U.S. PATENT DOCUMENTS

| | | | |
|---|---|---|---|
| 2015/0058642 A1* | 2/2015 | Okamoto | G06F 13/14 |
| | | | 713/300 |
| 2015/0137791 A1* | 5/2015 | Remple | G01R 19/0084 |
| | | | 324/76.11 |
| 2015/0309953 A1 | 10/2015 | Steele et al. | 710/316 |
| 2016/0056651 A1* | 2/2016 | Von Novak, III | H02J 7/00 |
| | | | 320/114 |
| 2016/0062935 A1* | 3/2016 | Talmola | G06F 1/266 |
| | | | 710/306 |
| 2016/0342492 A1* | 11/2016 | Chen | G06F 13/4282 |
| 2017/0139467 A1* | 5/2017 | Waters | G06F 1/3287 |

\* cited by examiner

AUTOMATIC USB HOST DETECTION AND PORT CONFIGURATION

PRIORITY

This application claims priority to U.S. Provisional Application No. 62/662,902 filed Apr. 26, 2018, the contents of which are hereby incorporated in their entirety.

TECHNICAL FIELD

The present disclosure relates to universal serial bus (USB) technology and, in particular, automatic USB host detection and port configuration.

BACKGROUND

The Universal Serial Bus (USB) 1.0 specification was originally developed in the 1990s to provide a bus and interface(s) to standardize communication between computers and peripheral devices, such as keyboards, printers, cursor pointing devices, external drives, and the like. Since then, USB has progressed into versions 2.0 and 3.0 and has become ubiquitous in computers as well as portable devices, such as smartphones, tablet computers, and MP3 players.

In USB communication, one device acts as a Host while another acts as a Device. The Host powers the bus, issues commands, and generally maintains control over the connection. The Device does not initiate any activity for control of the bus. For example, a personal computer acts as a Host to a USB "thumb" drive Device.

The On-the-Go (OTG) Specification allows a single Host and single Device to swap roles. For example, some tablet computers may function in a Device role and operate as a mass storage device when coupled to a personal computer Host, but may function as a Host when coupled to a peripheral device such as a keyboard.

USB hubs expand a single USB port into several so that more devices can be connected. A personal computer or automotive entertainment system, for example, may include multiple external USB ports but have an internal hub, rather than dedicated USB controllers for each port. As can be appreciated, difficulties can arise, however, in employing a USB hub with On-the-Go devices.

The FLEXCONNECT technology (for USB 2.0 and USB 3.0) produced by the Assignee of the present application are unique in the industry in that they can swap the upstream (Host) side port with one of the downstream (Device) side ports. In effect, a dual role (Host/Device) can take over the hub from the downstream port. Details on such a FLEXCONNECT-enabled hub may be found in U.S. Pat. No. 7,480,753, which is hereby incorporated by reference in its entirety as if fully set forth herein.

SUMMARY

Embodiments of the present disclosure include an apparatus. The apparatus may include a first detection circuit for a D+ connection of a USB port and a second detection circuit for a D− connection of the USB port. The apparatus may include a control circuit. The control circuit may be configured to disable, at the first detection circuit and the second detection circuit, respective impedances. The control circuit may be further configured to, after disabling the respective impedances, detect, at the first detection circuit and the second detection circuit, respective values from the D+ connection and the D− connection. The control circuit may be further configured to, based upon the respective values, switch the USB port between a device port configuration and a host port configuration. In combination with any of the above embodiments, the control circuit may be configured to switch the USB port between the device port configuration and the host port configuration without a command from a host connected to the USB hub. In combination with any of the above embodiments, the control circuit may be further configured to switch the USB port from the device port configuration to the host port configuration based upon the respective values resulting from disabling the respective impedances. In combination with any of the above embodiments, the control circuit may be further configured to enable, at the first detection circuit and the second detection circuit, respective current sources. In combination with any of the above embodiments, the control circuit may be further configured to, after enabling the respective current sources and disabling the respective impedances, detect the respective values. In combination with any of the above embodiments, the control circuit may be configured to determine that a USB host has connected to the USB port based upon a zero value in each of the respective values. In combination with any of the above embodiments, the control circuit may be configured to, in a host check mode, disable the respective impedances. In combination with any of the above embodiments, the control circuit may be configured to, in a host check mode, enable respective current sources in the first detection circuit and the second detection circuit. In combination with any of the above embodiments, the control circuit may be configured to, in a host check mode, after disabling the respective impedances and enabling the respective current sources, detect the respective values. In combination with any of the above embodiments, the control circuit may be configured to, in a device check mode, disable the respective impedances. In combination with any of the above embodiments, the control circuit may be configured to, in a device check mode, enable respective current sources in the first detection circuit and the second detection circuit. In combination with any of the above embodiments, the control circuit may be configured to, in a device check mode, after disabling the respective impedances and enabling the respective current sources, detect the respective values. In combination with any of the above embodiments, the control circuit may be configured to identify that the respective values are zero in an instance of the device check mode. In combination with any of the above embodiments, the control circuit may be configured to, based upon the identification that the respective values are zero in the instance of the device check mode, enter the host check mode.

Embodiments of the present disclosure may include an electronic device, microcontroller, system, USB hub, USB bridge, or switch including any of the apparatuses of the above embodiments. Embodiments of the present disclosure may include a processor and a non-transitory memory with instructions, the instructions, when read and executed by the processor, cause the processor to implement any of the above embodiments of the control circuit. Embodiments of the present disclosure may include articles of manufacture including non-transitory media including instructions of any of the above embodiments. Embodiments of the present disclosure may include methods performed by any of the above embodiments of apparatuses, electronic devices, microcontrollers, processors, instructions loaded on processors, USB hubs, systems, USB bridges, or switches.

DETAILED DESCRIPTION

Figure 1:
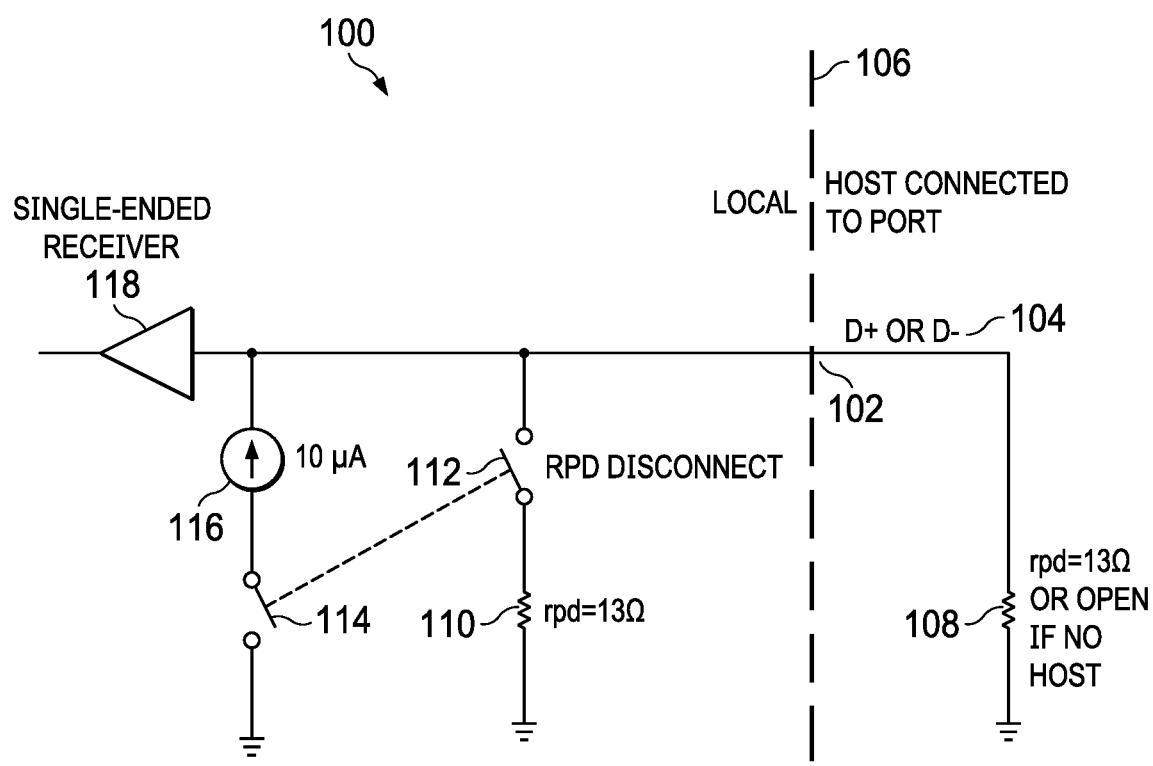
FIG. 1 is an illustration of an example circuit for detecting hosts, according, to embodiments of the present disclosure.

FIG. 1 is an illustration of an example circuit for detecting hosts, according, to embodiments of the present disclosure. The circuit may reside in, for example, a USB hub. The USB hub in turn may be embedded or implemented in any other suitable device or mechanism. Two instances of circuit 100 may exist for a given USB port. A given USB hub may include multiple USB ports. An instance of the circuit may exist for a D+ connection or signal of the USB port. Another instance of the circuit may exist for a D− connection or signal of the USB port. Pairs of the circuit may exist for each port in a USB hub.

The circuit may include a connection 102 to a D+ or D− signal 104 for the USB port. In FIG. 1, a dividing line 106 is illustrated that shows a logical division between portions of the circuit that are internal to the hub and connections external to the hub.

External to the hub, a connection may be made to no USB element at all, a USB host, or a USB device. If the connection is made to a USB host, then there may be an Rpd 108 within the USB host connected to the D+ or D− connection. The Rpd may have a value of 13 kohms. If the connection is made to a USB device or to no USB element at all, the Rpd might not be present on the connection to the D+ or D−.

Internal to the hub, the hub may include a Rpd 100. The Rpd may have a value of 13 kohms. The Rpd may be connected to the D+ or D− connection or signal. The Rpd may be connected on another side to ground. In one embodiment, a switch 112 may be connected between the Rpd and the D+ or D− connection. The D+ or D− connection or signal may be connected to a single-ended receiver 118. Single-ended receiver 118 may be implemented as an output buffer. In one embodiment, in parallel with the branch for Rpd 112, a current source 116 may be connected. The current source may be, for example, 10 microamps. In another embodiment, a switch 114 may be connected between the D+ or D− connection and ground on the branch including the current source. In yet another embodiment, a programmable or controllable current source may be used with the capability of switching on or off. In such an embodiment, the programmable or controllable aspect of the current source may be represented in FIG. 1 by the switch.

In one embodiment, the switches of the two branches— Rpd disconnect switch and the current source switch—may operate inversely to each other. When Rpd is connected, the current source may be switched off. When the Rpd is not connected, the current source may be switched on. According to the USB standard, the Rpd must always be connected and no switch is to be available in the branch, much less used to disconnect the Rpd from the D− or D+ connection. The purpose of the Rpd is to provide the ability to take a voltage measurement to identify a disconnect from an external element on the D− or D+ connection.

The switches may be configured to periodically enable the current source and disable the Rpd. This may be performed, for example, every 100 milliseconds. Enabling the current source and disabling the Rpd may allow the circuit to perform host connection detection downstream. Disabling the current source and enabling the Rpd may allow the circuit to perform USB disconnect detection. If a downstream host is detected, the hub may reconfigure the port as a USB host port. The reconfiguration may be performed with FLEXCONNECT. Control of the switches may be made by, for example, a processor or microcontroller. The processor or microcontroller may be internal or external to the hub. The processor or microcontroller may further read values of the circuit and control the USB hub port operation as a result.

As a result, a system using the circuit may detect, automatically, a downstream host connection on a USB port. Moreover, the system may switch the port from a downstream port or a device port to a host port. This detection and switching may be performed without commands or requests made by the downstream host. The detection and switching may be performed based upon the measurements of the circuit. Accordingly, the hub may be able to accept a host on any port that includes the circuit and can be switched between a device port and a host port. The host need not know anything about the USB hub.

In other solutions, only the upstream port of a USB hub can accommodate a host. Only devices can be connected to downstream ports of a hub. The Microchip hub feature "FlexConnect" swaps the upstream and downstream roles of 2 ports, but must be initiated with external stimulus before a downstream port can become upstream. The external stimulus includes a host knowing that the hub can switch and thus issuing a command to the hub. A user is therefore constrained as to which port can be connected to the host; only the upstream port or a previously role-swapped downstream port can be successfully connected to a host. Embodiments of the present disclosure, on the other hand, can perform the role swapping of any downstream port to the upstream port by simply connecting the host to any port. One practical application would be a USB repeater, which could enable OTG-like role swapping without any awareness or action by the host.

As a result, embodiments of the present disclosure provide significantly greater flexibility and ease of use for USB hubs that would otherwise require reconfiguration. Normally, connecting a host to a downstream port fails without external intervention. Thus, embodiments of the present disclosure make connection errors irrelevant. Furthermore, embodiments of the present disclosure allow direction-agnostic USB connection products that do not currently exist.

Embodiments of the present disclosure may rapidly and repeatedly engage and disengage the RPD resistor and current source to detect the presence of a USB host or device connected to a port. The process is brief enough to appear transparent to users. The process also detects if nothing is connected to the port. Embodiments of the present disclosure also reconfigure the hub to correspond to the results of the findings of the test, be it host, device, or nothing.

If no device is attached, when the 10 uA current source is injected on D− and Rpd disabled, the line state of D− is checked. If D− is zero, a host is present. If D− is one, no host is present. Thus, this test may be applied once a device detection test is already made.

Figure 2:
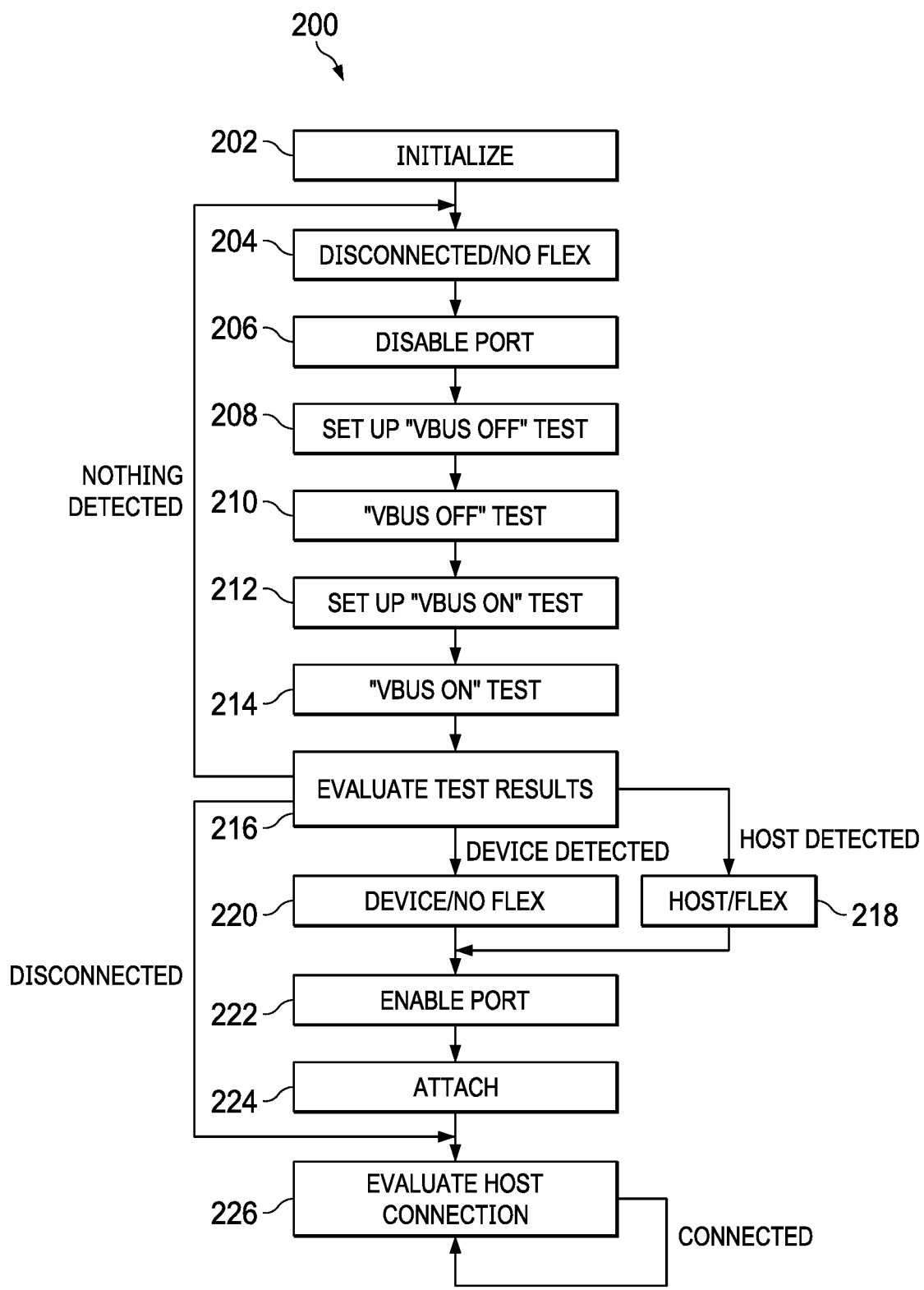
FIG. 2 is an illustration of an example flowchart of operation of a microcontroller, processor, or firmware thereon to perform automatic downstream host detection in conjunction with the circuit, according to embodiments of the present disclosure.

FIG. 2 illustrates an example flowchart 200 of operation of a microcontroller, processor, or firmware thereon to perform automatic downstream host detection in conjunction with the circuit, according to embodiments of the present disclosure. Flowchart 200 may implement operation of a USB hub for a given USB port. Flowchart 200 may represent a state machine.

At 202, firmware of a USB hub may be initialized. At 204, a state of disconnect may be entered, wherein no element is considered connected. Even if an element is connected, it may be ignored at this step.

At 206, the port in question may be disabled. At 208 and 210, a test called "VBUS OFF" may be initiated and performed, wherein the current source is disabled and the Rpd is disabled for each test circuit in the port. At 212 and 214, a test called "VBUS ON" may be initiated and performed, wherein the current source is activated and the Rpd is disabled. At 216, the test results of 208-214 may be evaluated. Details on the specific tests, output values, and associated devices are shown in FIGS. 3-11. At 216, if a host is detected, then at 218 the port may be set to a host port. At 216, if a device is detected, then at 220 the port may be set to a device port. At 216, if nothing is detected, the disconnect state at 204 may be reentered.

At 222, if a device or host were detected, the port may be enabled. At 224, the port may be attached. The port may be in a usable condition.

At 226, the connection may be monitored. Upon disconnect, the disconnected state may be reentered at 204. If the connection remains, the state of 226 may be repeated.

Figure 3:
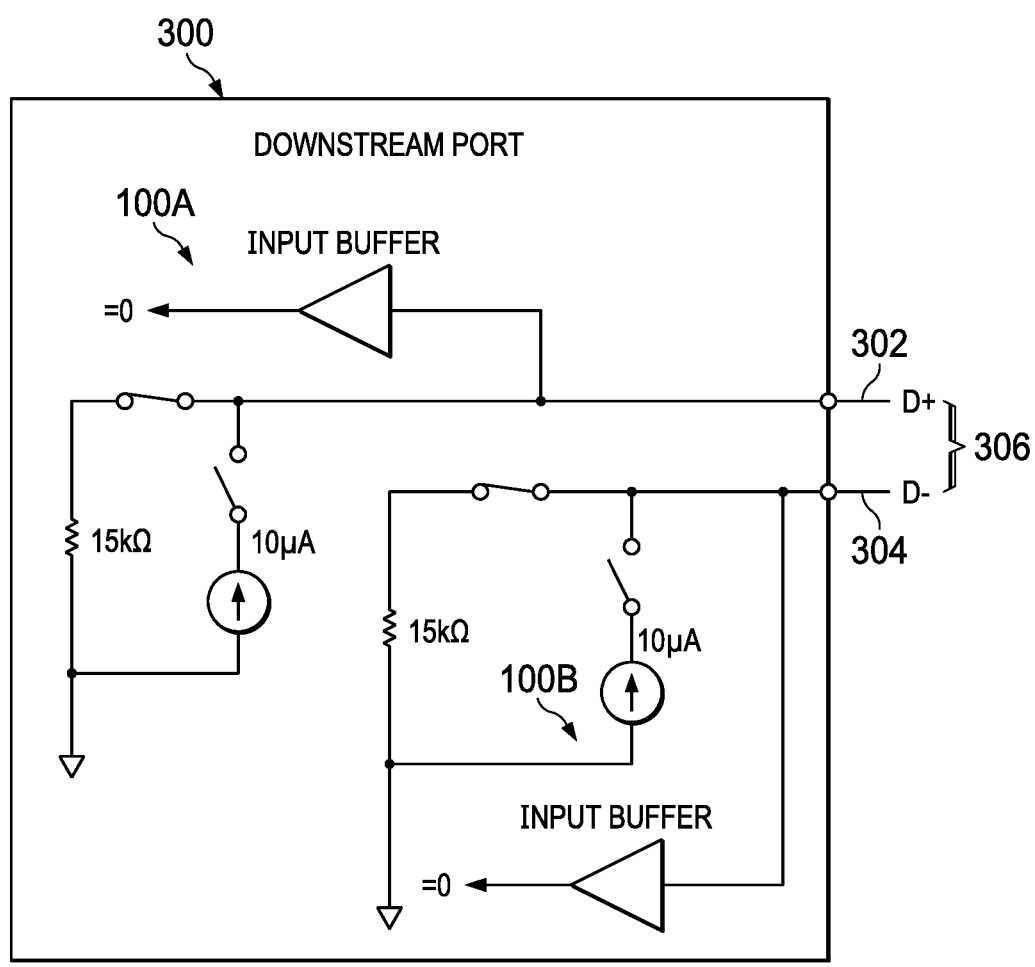
FIG. 3 is an illustration of a test circuit for a port, including D+ and D− lines, according to embodiments of the present disclosure.

FIG. 3 is an illustration of a test circuit 300 for a port, including D+ 302 and D− 304 lines, according to embodiments of the present disclosure. Test circuit 300 may include an implementation of circuit 100 for each of D+ 302 and D− 304 lines. For example, test circuit 300 may include a circuit 100A for D+ 302 line, and a circuit 100B for D− 304 line.

A combination of D+ 302 line and D− 304 line may form part of a single USB port 306.

FIGS. 3-10 may illustrate operation and modes of test circuit 300 when device check modes and host check modes are used with various connected USB elements (or none). In each of FIGS. 3-10, output of the input buffers or single-ended receivers 118 may be illustrated. This output may be used to determine whether or not a given USB element is attached to the signal line.

In FIG. 3, nothing might be attached to the D+ and D− lines 302, 304. A device check mode may be used to determine whether a device is connected to the USB hub or port. A host check mode may be used to determine whether a host is connected to the USB hub or port. The check modes may be mutually exclusive. The check modes may be alternated periodically. A device check mode may include enabling Rpds of respective test circuits through, for example, the respective switches. In the device check mode, the current source of the respective test circuits may be disabled. A host check mode may include disabling Rpds of respective test circuits through, for example, the respective switches. In the host check mode, the current source of the respective test circuits may be enabled.

In a device check mode, when nothing is attached to the port, the current sources disabled, and the Rpd enabled, the D+ and D− lines may be zero. That is, respective input buffers for the test circuits 100 in circuit 100 may each yield a zero.

Figure 4:
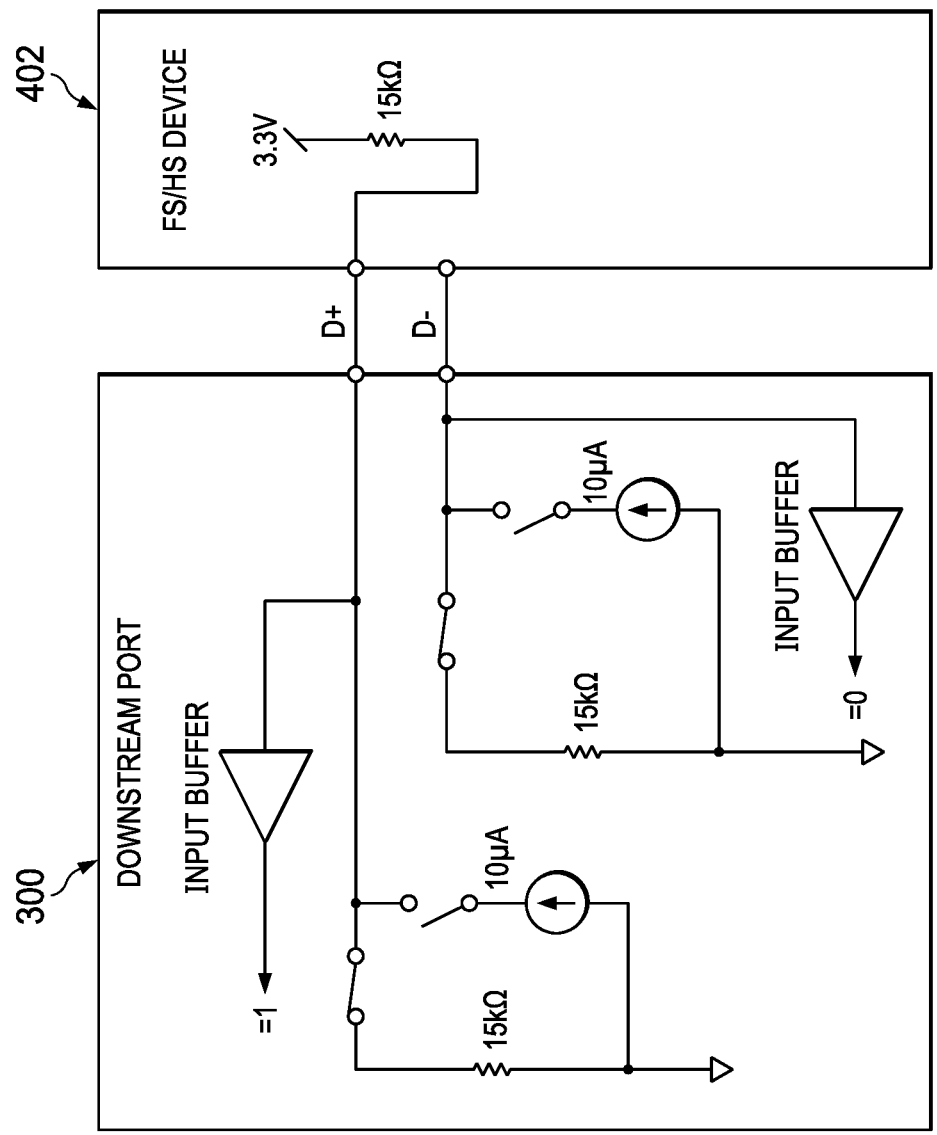
FIG. 4 illustrates a device check mode when a full-speed or high-speed device is attached, the current sources disabled, and the Rpd enabled, the D+ line may be one and the D− line may be zero, according to embodiments of the present disclosure.

As shown in FIG. 4, in the device check mode, when a full-speed or high-speed device 402 is attached, the current sources disabled, and the Rpd enabled, the D+ line may be one and the D− line may be zero.

Figure 5:
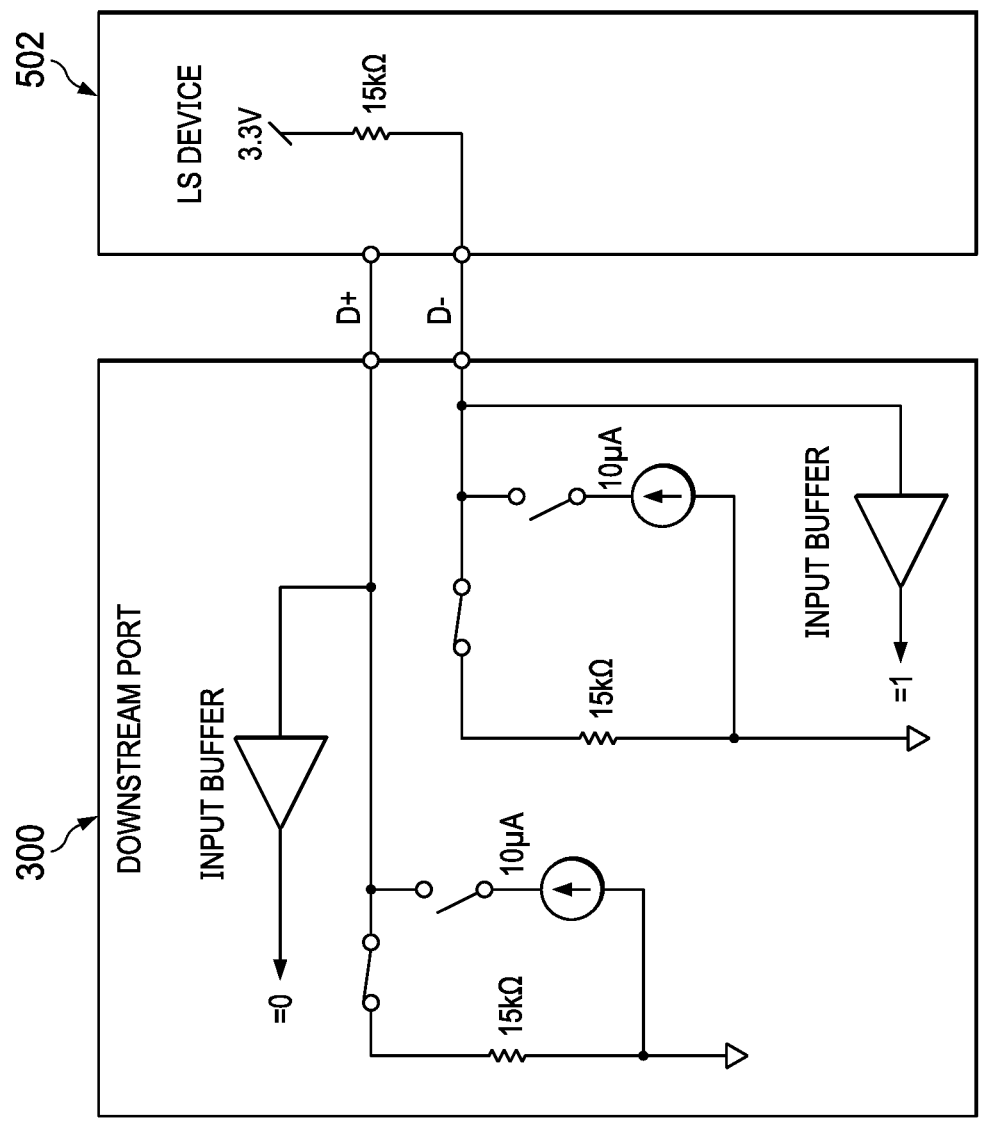
FIG. 5 illustrates a device check mode when a low-speed device is attached, the current sources disabled, and the Rpd enabled, the D+ line may be zero and the D− line may be one, according to embodiments of the present disclosure.

As shown in FIG. 5, in the device check mode, when a low-speed device 502 is attached, the current sources disabled, and the Rpd enabled, the D+ line may be zero and the D− line may be one.

Figure 6:
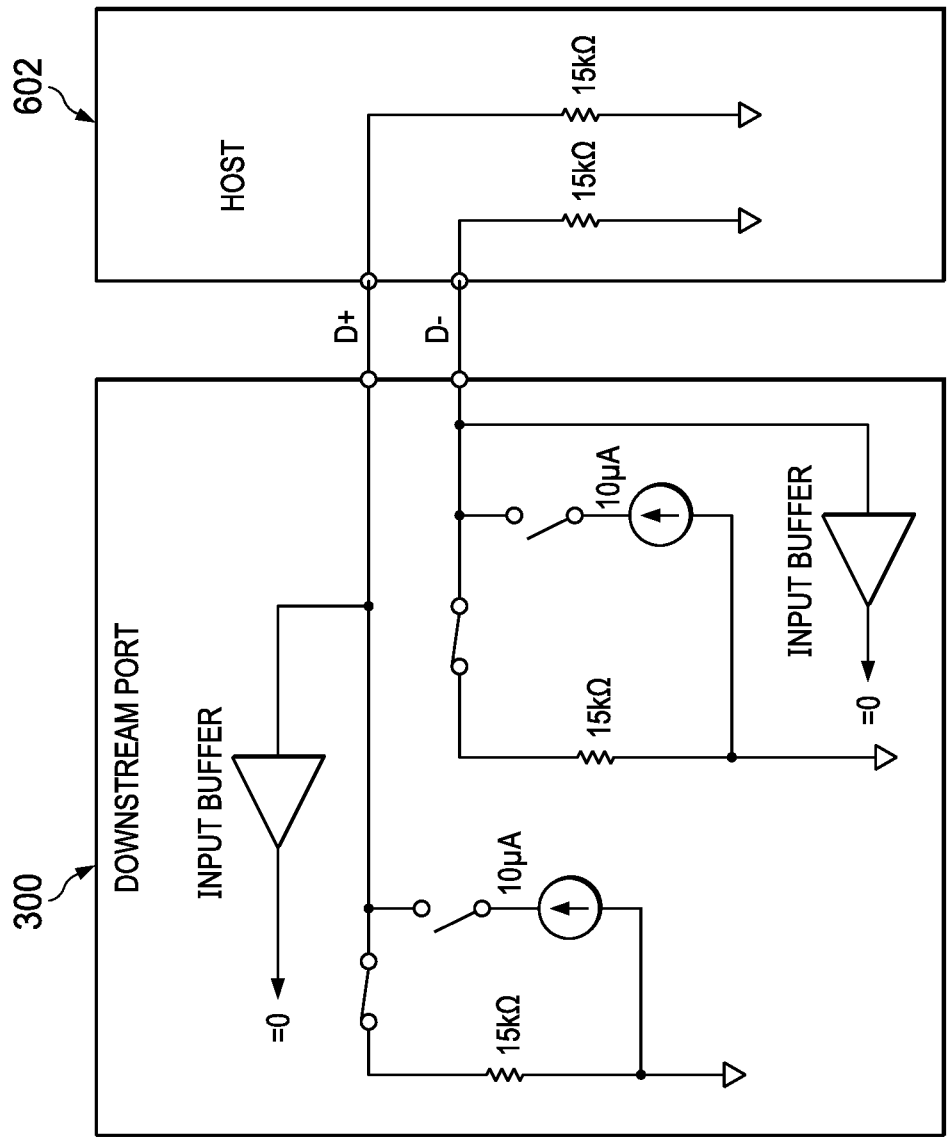
FIG. 6 illustrates a device check mode when a host is attached, the current sources disabled, and the Rpd enabled, the D+ line may be zero and the D− line may be zero, according to embodiments of the present disclosure.

As shown in FIG. 6, in the device check mode, when a host 602 is attached, the current sources disabled, and the Rpd enabled, the D+ line may be zero and the D− line may be zero.

Figure 7:
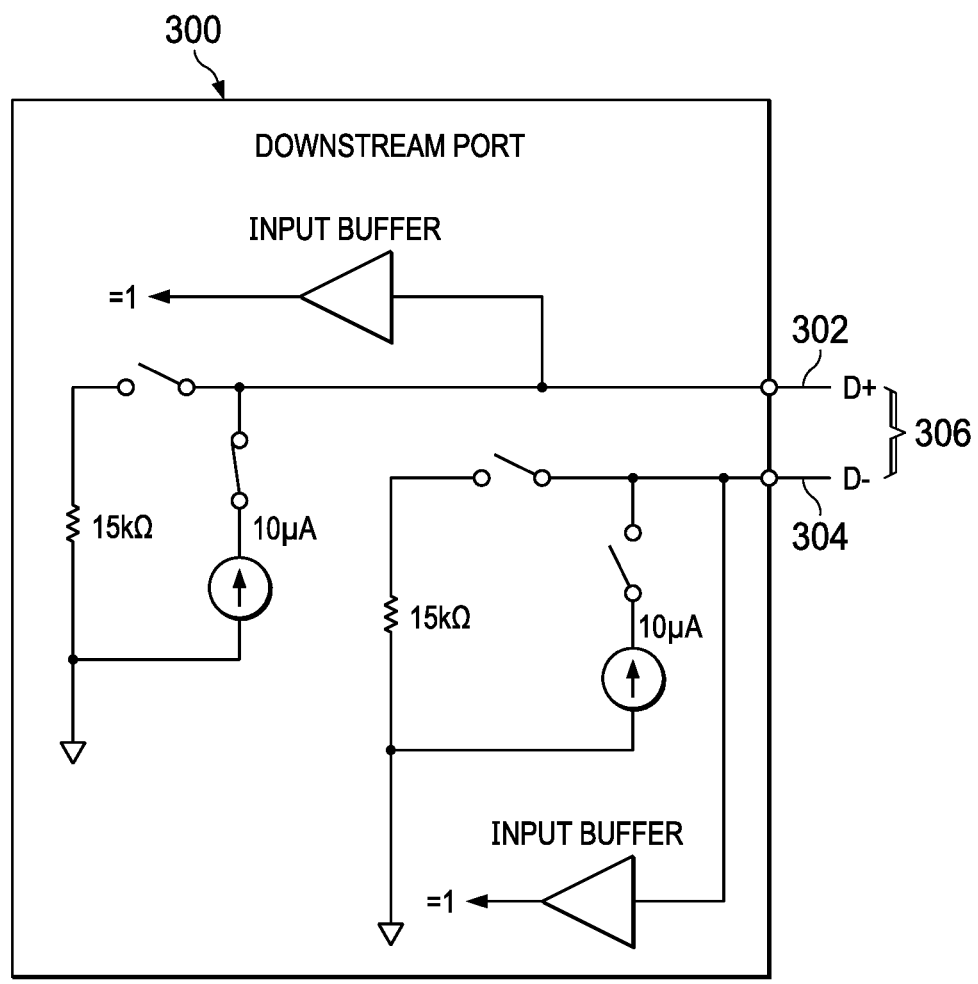
FIG. 7 illustrates a host check mode when nothing is attached, the current sources enabled, and the Rpd disabled, the D+ line may be one and the D− line may be one, according to embodiments of the present disclosure.

As shown in FIG. 7, in the host check mode, when nothing is attached, the current sources enabled, and the Rpd disabled, the D+ line may be one and the D− line may be one.

Figure 8:
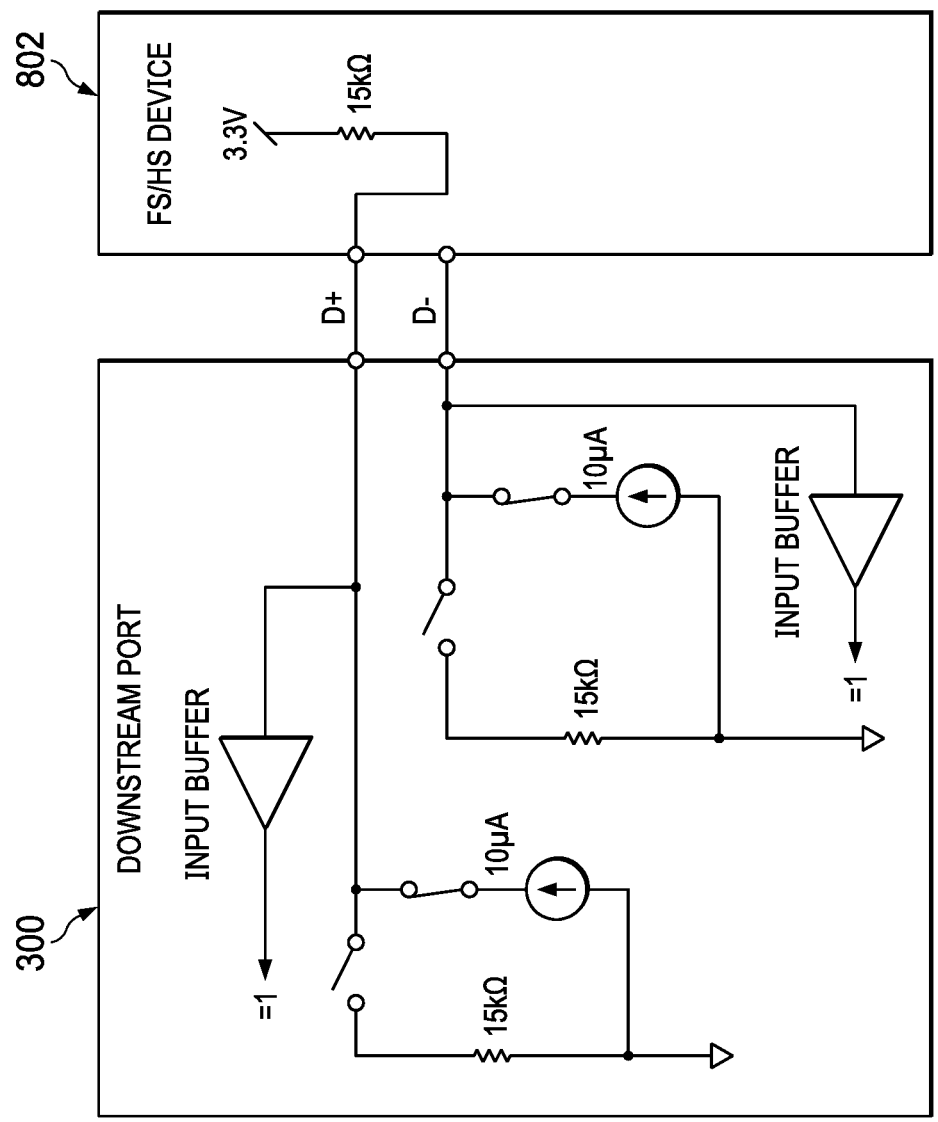
FIG. 8 illustrates a host check mode when a full-speed or high-speed device is attached, the current sources enabled, and the Rpd disabled, the D+ line may be one and the D− line may be one, according to embodiments of the present disclosure.

As shown in FIG. 8, in the host check mode, when a full-speed or high-speed device 802 is attached, the current sources enabled, and the Rpd disabled, the D+ line may be one and the D− line may be one.

Figure 9:
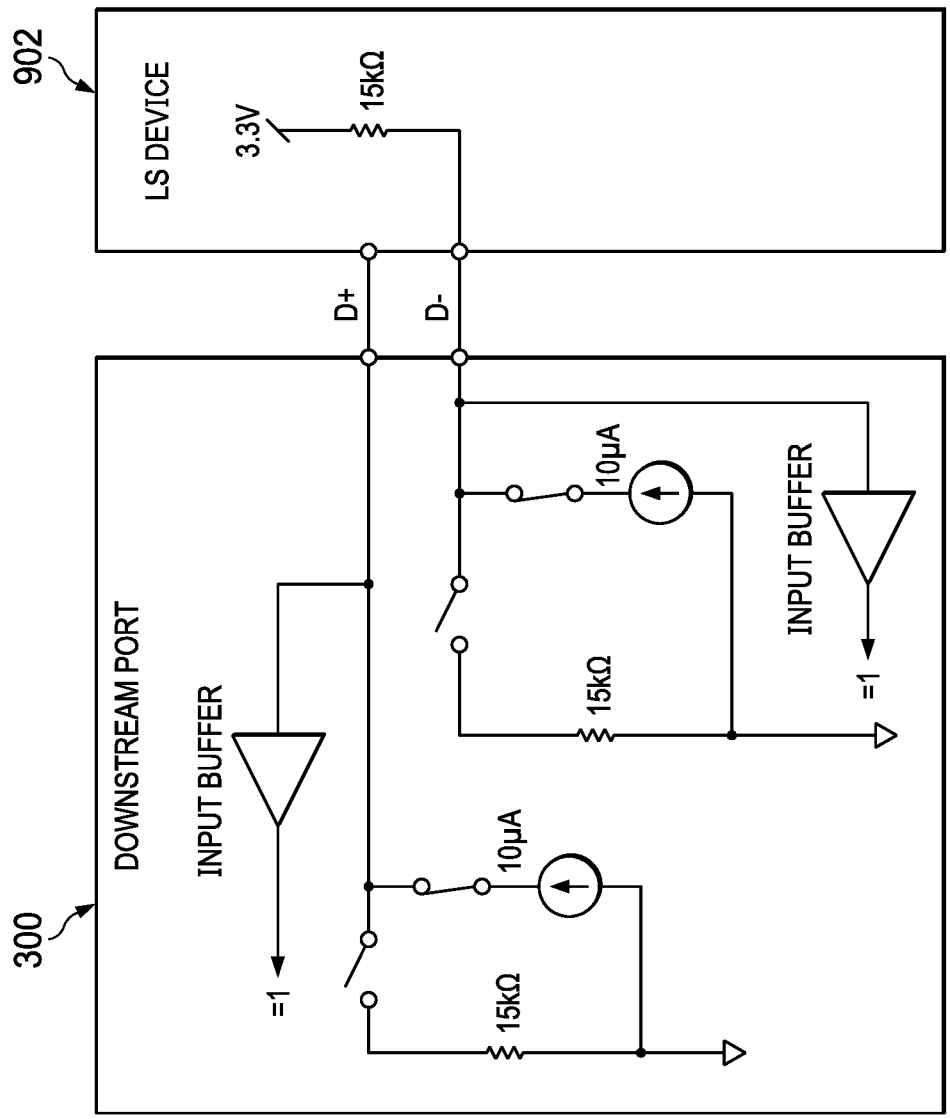
FIG. 9 illustrates a host check mode when a low-speed device is attached, the current sources enabled, and the Rpd disabled, the D+ line may be one and the D− line may be one, according to embodiments of the present disclosure.

As shown in FIG. 9, in the host check mode, when a low-speed device 902 is attached, the current sources enabled, and the Rpd disabled, the D+ line may be one and the D− line may be one.

Figure 10:
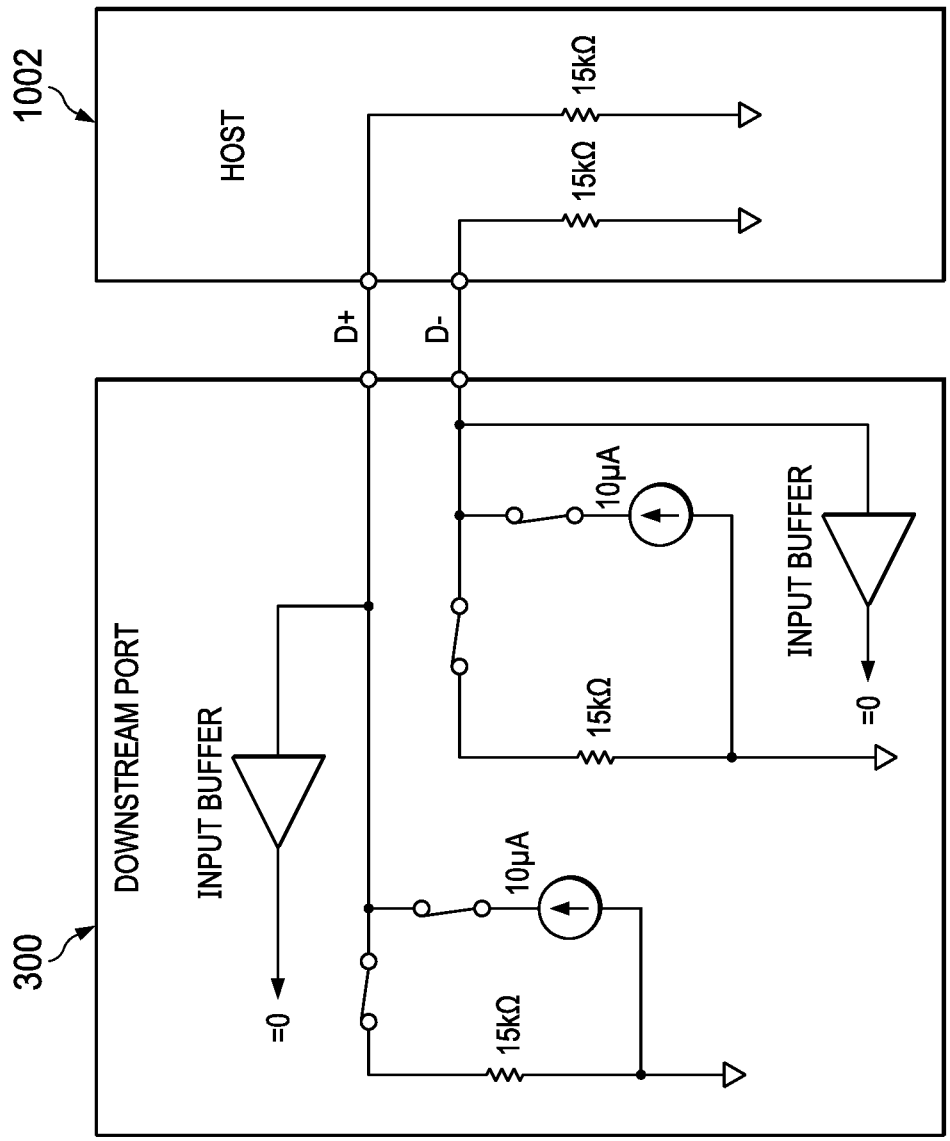
FIG. 10 illustrates a host check mode, when a host is attached, the current sources enabled, and the Rpd disabled, the D+ line may be zero and the D− line may be zero, according to embodiments of the present disclosure.

As shown in FIG. 10, in the host check mode, when a host 1002 is attached, the current sources enabled, and the Rpd disabled, the D+ line may be zero and the D− line may be zero.

Figure 11:
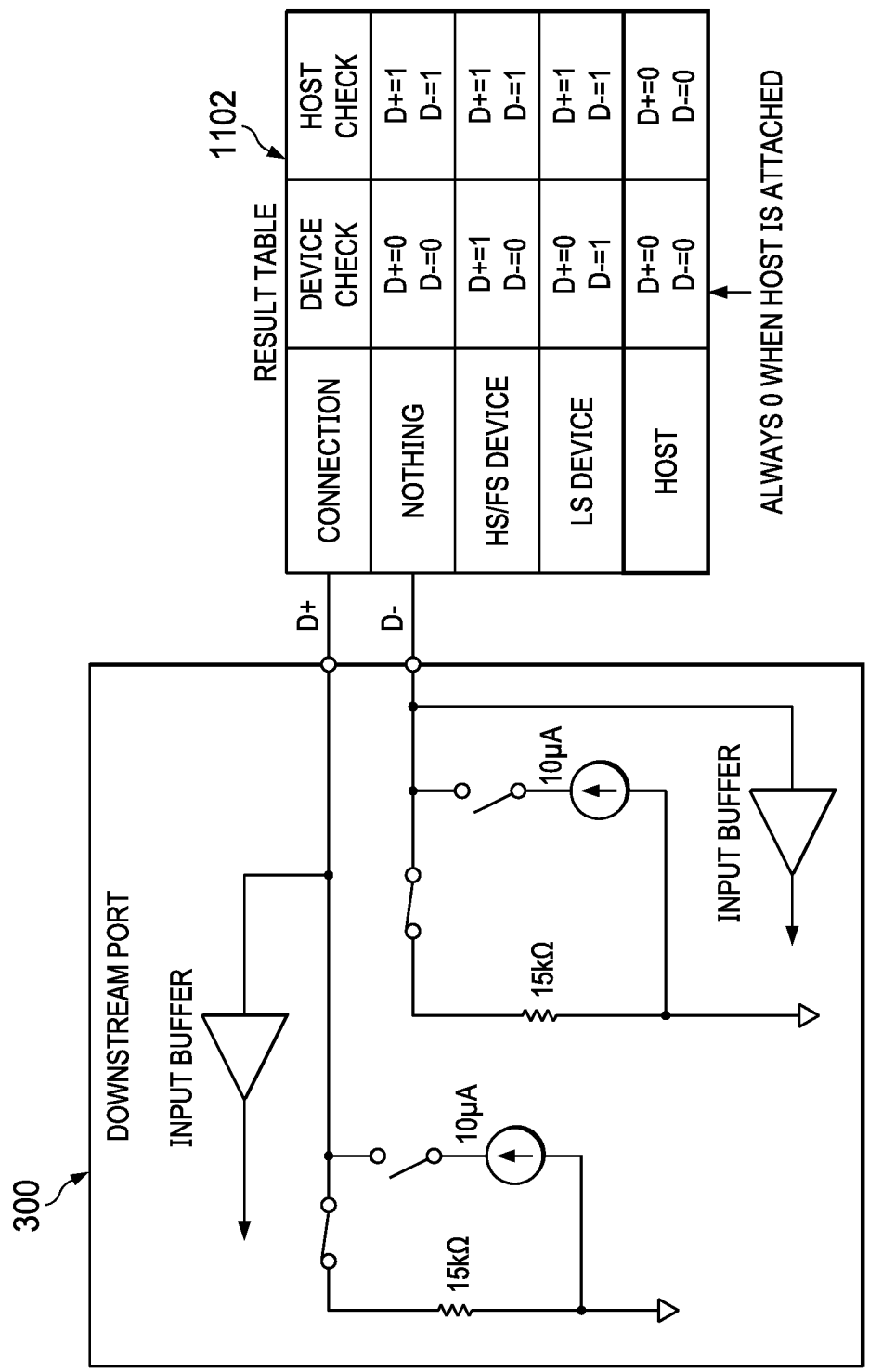
FIG. 11 illustrates a summary of modes and results, according to embodiments of the present disclosure.

FIG. 11 illustrates a summary table 1102 of modes and results, according to embodiments of the present disclosure.

A microcontroller or processor monitoring the circuit may employ host check mode periodically or upon a determination that the device check mode returned zero values for both D+ and D− connections. Similarly, a device check mode may be employed when a host check mode returns one values for D+ and D− connections.

Figure 12:
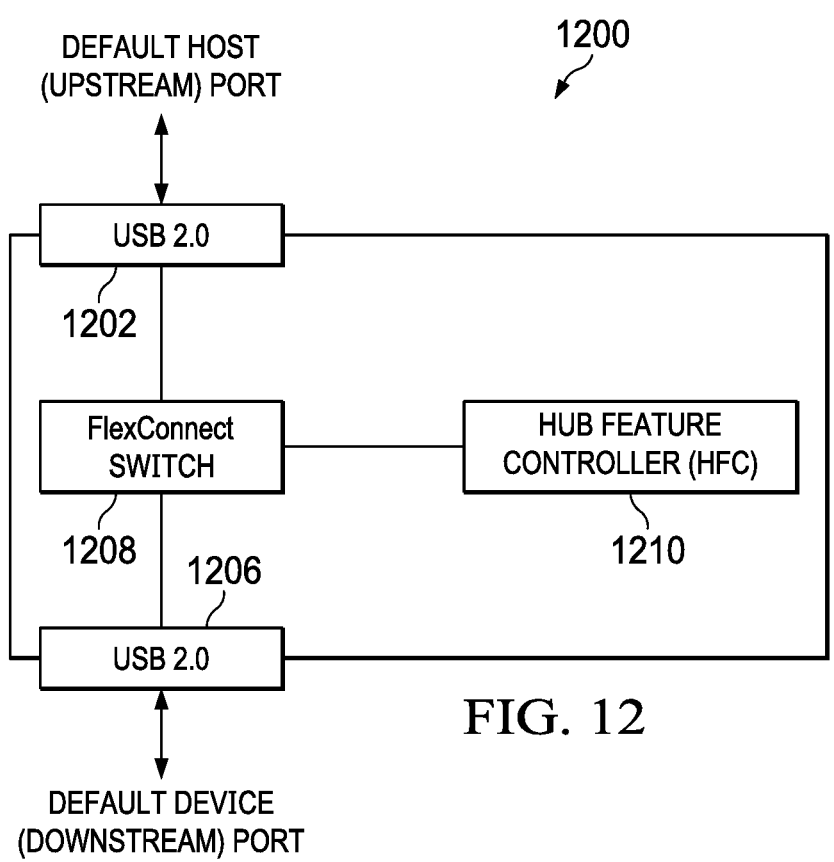
FIG. 12 is an illustration of an example system that includes a circuit for detecting whether a downstream host has been connected to a port that can be configured to be either a host port or a device port, according to embodiments of the present disclosure.

FIG. 12 is an illustration of an example system 1200 that includes a circuit for detecting whether a downstream host has been connected to a port 1206 that can be configured to be either a host port or a device port, according to embodiments of the present disclosure. Such a bidirectional port 1206 may otherwise comply with the USB 2.0 Specification, but may be referred to as an AutoFlex port or a Default Device Port. Other ports may include, for example, a port 1202 otherwise compliant with the USB 2.0 Specification that may be by default a host port, or connected to an element that is a host. Such an element may include, for example, a head unit of an automobile. System 1200 may include a hub feature controller (HFC) 1210 that includes a processor or a microcontroller. HFC 1210 may perform external functions such as communication with other elements in a larger system. The communication may include USB to I2C bus conversion, general purpose input/output ports, access to memory or busses such as SPI or SPI flash, or busses to convey link statuses. This communication may include data to or from ports 1202, 1206. Components of a test circuit, such as circuit 100, may be implemented in any suitable portion of system 1200, such as in a hub 1208 or port 1206. Moreover, logic to control switches of circuit 100 may be included in hub 1208, as well as logic to evaluate the results of applying circuit 100. The logic may be implemented in, for example, HFC 1210.

HFC 1210 may detect a connection of a host to the Default Device Port 1206. The detection may be used with the circuits above and the analysis above for FIGS. 1-11. HFC 1210 may automatically initiate a switch of Default Device Port 1206 to a host port, or vice-versa, based upon a test of host check mode or device check mode. Users of system 1200 might not have to implement USB hosts with the requirement to issue a USB command to HFC 1210 to initiate the swapping of the port from a device port to a host port. HFC 1210 may be configured to conduct the device checks and host checks and perform swapping without receiving commands from elements attached to ports 1202, 1206. These commands, implemented for other solutions, may include a vendor-specified extension of the SETUP packet, which is a structure defined by the USB 2.0 Specification for communication, which may be known as a FlexConnect SETUP Command.

What is claimed is:

1. A universal serial bus (USB) hub, comprising:
a first detection circuit for a D+ connection of a USB port;
a second detection circuit for a D– connection of the USB port; and
a control circuit configured to:
disable, at the first detection circuit and the second detection circuit, respective impedances;
after disabling the respective impedances, detect, at the first detection circuit and the second detection circuit, respective values from the D+ connection and the D– connection; and
based upon the respective values, switch the USB port between a device port configuration and a host port configuration;
in a host check mode:
disable the respective impedances;
enable respective current sources in the first detection circuit and the second detection circuit; and
after disabling the respective impedances and enabling the respective current sources, detect the respective values; and
in a device check mode:
enable the respective impedances;
disable respective current sources in the first detection circuit and the second detection circuit; and
after enabling the respective impedances and disabling the respective current sources, detect the respective values;
identify that the respective values are zero in an instance of the device check mode; and
based upon the identification that the respective values are zero in the instance of the device check mode, enter the host check mode.

2. The USB hub of claim 1, wherein the control circuit is configured to switch the USB port between the device port configuration and the host port configuration without a command from a host connected to the USB hub.

3. The USB hub of claim 1, wherein the control circuit is further configured to switch the USB port from the device port configuration to the host port configuration based upon the respective values resulting from disabling the respective impedances.

4. The USB hub of claim 1, wherein the control circuit is further configured to enable, at the first detection circuit and the second detection circuit, respective current sources.

5. The USB hub of claim 4, wherein the control circuit is further configured to, after enabling the respective current sources and disabling the respective impedances, detect the respective values.

6. The USB hub of claim 1, wherein the control circuit is configured to determine that a USB host has connected to the USB port based upon a zero value in each of the respective values.

7. A method for operating a universal serial bus (USB) hub, comprising:
operating a first detection circuit to detect a D+ connection of a USB port;
operating a second detection circuit to detect a D– connection of the USB port; and
through a control circuit:
disabling, at the first detection circuit and the second detection circuit, respective impedances;
after disabling the respective impedances, detecting, at the first detection circuit and the second detection circuit, respective values from the D+ connection and the D– connection;
based upon the respective values, switching the USB port between a device port configuration and a host port configuration;
in a host check mode:
disabling the respective impedances;
enabling respective current sources in the first detection circuit and the second detection circuit; and
after disabling the respective impedances and enabling the respective current sources, detect the respective values; and
in a device check mode:
enabling the respective impedances;
disabling respective current sources in the first detection circuit and the second detection circuit; and
after enabling the respective impedances and disabling the respective current sources, detecting the respective values;
identifying that the respective values are zero in an instance of the device check mode; and
based upon the identification that the respective values are zero in the instance of the device check mode, entering the host check mode.

8. The method of claim 7, further comprising switching the USB port between the device port configuration and the host port configuration without a command from a host connected to the USB hub.

9. The method of claim 7 further comprising switching the USB port from the device port configuration to the host port configuration based upon the respective values resulting from disabling the respective impedances.

10. The method of claim 7, further comprising enabling, at the first detection circuit and the second detection circuit, respective current sources.

11. The method of claim 10, further comprising switching, after enabling the respective current sources and disabling the respective impedances, detecting the respective values.

12. The method of claim 7, further comprising determining that a USB host has connected to the USB port based upon a zero value in each of the respective values.

13. An article of manufacture, comprising a non-transitory memory including instructions, the instructions, when loaded and executed by a processor, configure the processor to:
operate a first detection circuit to detect a D+ connection of a USB port;
operate a second detection circuit to detect a D– connection of the USB port; and
through a control circuit:
disable, at the first detection circuit and the second detection circuit, respective impedances;
after disabling the respective impedances, detect, at the first detection circuit and the second detection circuit, respective values from the D+ connection and the D– connection; and
based upon the respective values, switch the USB port between a device port configuration and a host port configuration;
in a host check mode:
disable the respective impedances;
enable respective current sources in the first detection circuit and the second detection circuit; and
after disabling the respective impedances and enabling the respective current sources, detect the respective values; and
in a device check mode:
enable the respective impedances;
disable respective current sources in the first detection circuit and the second detection circuit; and
after enabling the respective impedances and disabling the respective current sources, detect the respective values;
identify that the respective values are zero in an instance of the device check mode; and
based upon the identification that the respective values are zero in the instance of the device check mode, enter the host check mode.

14. The article of claim 13, further comprising instructions to cause the processor to switch the USB port between the device port configuration and the host port configuration without a command from a host connected to the USB hub.

15. The article of claim 13, further comprising instructions to cause the processor to switch the USB port from the device port configuration to the host port configuration based upon the respective values resulting from disabling the respective impedances.

16. The article of claim 13, further comprising instructions to cause the processor to enable, at the first detection circuit and the second detection circuit, respective current sources.

17. The article of claim 16, further comprising instructions to cause the processor to, after enabling the respective current sources and disabling the respective impedances, detect the respective values.

18. The article of claim 13, further comprising instructions to cause the processor to determine that a USB host has connected to the USB port based upon a zero value in each of the respective values.

* * * * *